(12) United States Patent
Yang et al.

(10) Patent No.: US 10,271,094 B2
(45) Date of Patent: Apr. 23, 2019

(54) METHOD AND DEVICE FOR TRANSMITTING/RECEIVING MEDIA DATA

(71) Applicant: SAMSUNG ELECTRONICS CO., LTD., Suwon-si (KR)

(72) Inventors: Hyun-Koo Yang, Seoul (KR); Kyung-Mo Park, Seoul (KR); Young-Wan So, Gunpo-si (KR); Sang-Bae Chon, Suwon-si (KR); Hyun-Koo Kang, Yongin-si (KR); Sun-Min Kim, Yongin-si (KR); Jae-Yeon Song, Seoul (KR); Ji-Min Chung, Yongin-si (KR); Kyoung-Shin Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/549,423

(22) PCT Filed: Feb. 15, 2016

(86) PCT No.: PCT/KR2016/001520
§ 371 (c)(1),
(2) Date: Aug. 8, 2017

(87) PCT Pub. No.: WO2016/129981
PCT Pub. Date: Aug. 18, 2016

(65) Prior Publication Data
US 2018/0027278 A1  Jan. 25, 2018

(30) Foreign Application Priority Data

Feb. 13, 2015 (KR) .................. 10-2015-0022680
Feb. 13, 2015 (KR) .................. 10-2015-0022685
Feb. 13, 2015 (KR) .................. 10-2015-0022695

(51) Int. Cl.
| | | |
|---|---|---|
| H04N 7/173 | (2011.01) |
| H04N 21/439 | (2011.01) |
| H04N 21/8352 | (2011.01) |
| H04N 21/84 | (2011.01) |
| H04N 21/8543 | (2011.01) |
| H04N 21/858 | (2011.01) |
| H04N 21/435 | (2011.01) |

(52) U.S. Cl.
CPC ......... *H04N 21/439* (2013.01); *H04N 21/435* (2013.01); *H04N 21/8352* (2013.01);
(Continued)

(58) Field of Classification Search
CPC combination set(s) only.
See application file for complete search history.

(56) References Cited

U.S. PATENT DOCUMENTS

2008/0172451 A1   7/2008  Kim et al.
2011/0292173 A1  12/2011  Tsukagoshi
(Continued)

FOREIGN PATENT DOCUMENTS

JP    201210311 A    1/2012
KR    100782014 B1  12/2007
(Continued)

OTHER PUBLICATIONS

International Search Report dated Jun. 29, 2016, by the International Searching Authority in counterpart International Application No. PCT/KR2016/001520 (PCT/ISA/210).
(Continued)

*Primary Examiner* — Mulugeta Mengesha
(74) *Attorney, Agent, or Firm* — Sughrue Mion, PLLC

(57) ABSTRACT

A method for processing a content by a set-top box according to an embodiment of the present disclosure comprises the steps of: receiving a content including an audio stream; and performing bypassing to output the audio stream to a television (TV) through an output interface without perform-
(Continued)

ing a decoding operation for the audio stream, wherein the audio stream includes metadata regarding the content.

4 Claims, 5 Drawing Sheets

(52) U.S. Cl.
CPC .......... *H04N 21/84* (2013.01); *H04N 21/858* (2013.01); *H04N 21/8543* (2013.01)

(56) References Cited

U.S. PATENT DOCUMENTS

| | | |
|---|---|---|
| 2013/0093952 A1 | 4/2013 | Lefevre et al. |
| 2016/0196830 A1 | 7/2016 | Riedmiller et al. |
| 2017/0127093 A1* | 5/2017 | Tsukagoshi .......... H04N 21/236 |
| 2017/0223429 A1* | 8/2017 | Schreiner ............ H04N 21/812 |

FOREIGN PATENT DOCUMENTS

| | | |
|---|---|---|
| KR | 101221473 B1 | 1/2013 |
| KR | 1020130088827 A | 8/2013 |
| KR | 2020140006469 U | 12/2014 |

OTHER PUBLICATIONS

Written Opinion dated Jun. 29, 2016, by the International Searching Authority in counterpart International Application No. PCT/KR2016/001520 (PCT/ISA/237).

* cited by examiner

METHOD AND DEVICE FOR TRANSMITTING/RECEIVING MEDIA DATA

This application is a National Phase Entry of PCT International Application No. PCT/KR2016/001520, which was filed on Feb. 15, 2016, and claims a priority to Korean Patent Application No. 10-2015-0022685, which was filed on Feb. 13, 2015, Korean Patent Application No. 10-2015-0022695, which was filed on Feb. 13, 2015, and claims a priority to Korean Patent Application No. 10-2015-0022680, which was filed on Feb. 13, 2015, and the contents of which are incorporated herein by reference.

TECHNICAL FIELD

The present disclosure relates to a method and apparatus for transmitting and receiving media data.

BACKGROUND ART

With the explosive growth of wired/wireless Internet, various types of Internet televisions (TVs) are expected to become a meaningful part of human lives. Although audio/video (A/V) signal delivery over the wired/wireless Internet may not be able to replace existing broadcasting for the present, future broadcasting services may evolve into a hybrid service type that integrates a broadcasting network with the Internet. Unlike in the past when a dedicated network was used for content delivery between content providers or for content delivery to a secondary distribution network, in recent times, content is delivered through an Internet protocol (IP) network to reduce cost incurred by the use of a separate dedicated network and to cut down high equipment cost caused by a specified interface.

Current digital broadcasting is expected to evolve into stereo three-dimensional (3D) video broadcasting, ultra-high definition (UHD) broadcasting, multi-view 3D video broadcasting, hologram broadcasting, etc., and there is a prospect that a current Moving Picture Experts Group 2 (MPEG2)-transport stream (TS) may become inefficient because in each forward step, a larger amount of data transmission is required.

For example, since UHD broadcasting may have a resolution that is four-times (4K-level) or 16-times than that of an existing high definition (HD) TV, a 6-MHz TV program may be difficult to transmit in one channel in spite of application of a high-efficiency compression scheme. As such, when high data rate is needed, an MPEG-2 TS having a packet with a fixed length of 188 bytes may be inefficient. Moreover, in an environment where all other networks than a broadcasting network change into IP networks, the MPEG-2 TS is not easy to use by mutual conversion with the IP. Hence, at a moment when UHD broadcasting is to be commercialized, a new AV delivery format may be required which is IP-friendly and more efficient than the MPEG-2 TS.

DETAILED DESCRIPTION OF THE INVENTION

Technical Problem

Meanwhile, information related to content, e.g., metadata is included in the content to provide a broadcasting service to a user, and in the course of providing the content to the user, the metadata may be lost. For example, content received from a broadcasting network or a cable network for IP TV watching is delivered to a user's TV through a set-top box, and during processing of the content in the set-top box, metadata included in the content may be entirely consumed or removed and only pure video and/or audio data of the content may be delivered in an uncompressed form to the TV. In this case, the metadata that is available in the user's TV may be lost. For reference, the metadata may be information from which an additional service related to a main service provided in a broadcasting service may be obtained in the user's TV through an Internet network.

The present disclosure provides a method and apparatus for providing metadata related to content to a user.

An embodiment of the present disclosure provides a method and apparatus for providing metadata related to content to a user by using an audio stream.

An embodiment of the present disclosure provides a method and apparatus for configuring metadata related to a content. An embodiment of the present disclosure provides a compressed media data format including metadata related to content.

An embodiment of the present disclosure provides a method and apparatus for delivering metadata to a user's TV by using a compressed media data format.

An embodiment of the present disclosure provides a method and apparatus for providing an additional service by using metadata, which is delivered to a user's TV by using a compressed media data format.

Technical Solution

A method for processing content in a set-top box according to an embodiment of the present disclosure includes receiving content including an audio stream and bypassing the audio stream to a television (TV) through an output interface without performing a decoding operation with respect to the audio stream, in which the audio stream comprises metadata regarding the content.

A method for playing back content in a TV according to an embodiment of the present disclosure includes receiving an audio stream including metadata delivered from a set-top box to the TV, extracting the metadata from the audio stream, modifying the extracted metadata to process the metadata, delivering information for playing back media data to a player if the information for playing back the media data exists in the metadata, and delivering information for obtaining media data to a media transmission processor if the information for obtaining the media data exists in the metadata, obtaining the media data through predetermined interface and protocol by using the information for obtaining the media data, decoding the obtained media data, and playing back the decoded media data by using the information for playing back the media data.

A set-top box for processing content according to an embodiment of the present disclosure includes an audio processor configured to receive content including an audio stream and to bypass the audio stream to a TV through an output interface without performing a decoding operation with respect to the audio stream, in which the audio stream includes metadata regarding the content.

A TV for processing content according to an embodiment of the present disclosure includes a metadata processor configured to process metadata, in which the metadata processor includes a metadata extractor configured to receive an audio stream including metadata delivered from a set-top box to the TV and to extract the metadata from the audio stream, a metadata analyzer configured to modify the extracted metadata to process the metadata, to deliver information for playing back media data to a player if the information for playing back the media data exists in the metadata, and to deliver information for obtaining media data to a media transmission processor if the information for obtaining the media data exists in the metadata, the media transmission processor configured to obtain the media data through predetermined interface and protocol by using the information for obtaining the media data and to deliver the obtained media data to a decoder, the decoder configured to decode the obtained media data, and a media player configured to play back the decoded media data by using the information for playing back the media data.

MODE FOR CARRYING OUT THE INVENTION

Figure 1:
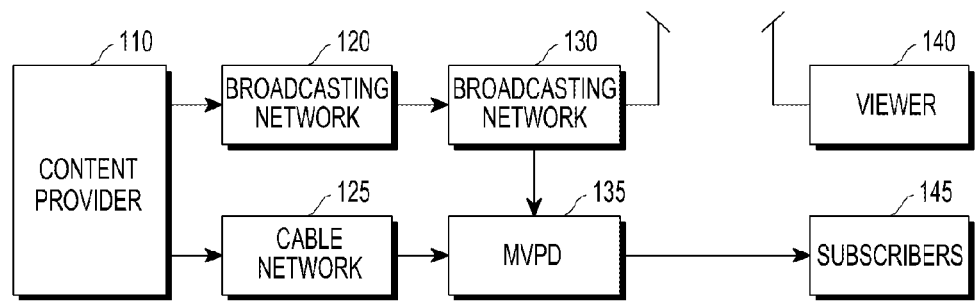
FIG. 1 is a block diagram of entities of a service eco system in a general broadcasting service.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

First, terms used herein will be defined in brief.

The term "content(s)" collectively refers to digital information or materials provided through various wired/wireless communication networks. For example, each of a television (TV) program, a movie, and an electronic book may be one content. Typically, one content includes at least one of a video stream, an audio stream, and a text stream. Herein, the term "content(s)" may be used as the same meaning as media data or as a meaning including the media data. According to circumstances, the term "service" may be interchangeably used with the term "content(s)".

Before the present disclosure is described in detail, the basic concept of the present disclosure will be described.

The basic concept of the present disclosure is that metadata related to content is included in a compressed audio stream of the content to deliver the metadata to a user's TV through a set-top box. When the metadata is included in the compressed audio stream in this way, the metadata in the form of a text is first extracted before a processor for processing an audio stream in the TV presents the entire audio stream, and the extracted metadata is used. As a representative example of the basic concept of the present disclosure, if uniform resource locator (URL) information in the form of a text for obtaining an additional service related to a main service is included in a compressed audio stream of the main service, a set-top box having received the compressed audio stream delivers the compressed audio stream to the TV without decompressing the compressed audio stream, such that the TV obtains the text-form URL information from the compressed audio stream and obtains the additional service by using the URL information.

Meanwhile, the following description is mainly related to metadata in the present disclosure.

In the present disclosure, metadata may include information for indicating a system for processing the metadata. For example, "system type (systype)" information is included in the metadata, and the system type may include information about a system such as a Moving Picture Experts Group (MPEG) system, an MPEG media transport (MMT) system, a dynamic adaptive streaming over hypertext transfer protocol (HTTP) (DASH) system, etc.

In the present disclosure, metadata may include URL information for obtaining data related to additional content/service, and may include an identifier of a service including a stream including the metadata.

In the present disclosure, the metadata may have the form of a packet defined in a system such as the MPEG, the MMT, the DASH standards, etc., or may have the form of a signaling message.

In the present disclosure, an entity that generates metadata is as described below. First, a content provider such as a studio may generate metadata. An entity on a broadcasting network or a cable network may add new metadata to current metadata or modify or remove the current metadata. The entity on the broadcasting network or the cable network may generate new metadata and substitutes current metadata with the newly generated metadata. An entity related to media transmission such as a multichannel video programming distributor (MVPD) may also perform the addition, modification, removal, and substitution operations. The above operations of the MVPD will be described later with reference to FIG. 4. An STB connected to a subscriber's TV may also perform the addition, modification, removal, and substitution operations. The above operations of the STB will be described later with reference to FIG. 5.

In the present disclosure, the metadata is delivered to a TV through an audio stream. For this end, in the present disclosure, a metadata processor for processing the metadata is included in the TV. An operation of the metadata processor may vary with a type of the metadata. For example, the operation of the metadata processor may differ with a case where an input to the metadata processor has the form of an MMTP packet including an MMT signaling message, a case where metadata is an identifier of content, a case where metadata is a DASH MPD, and a case where metadata is data used in a particular application. A detailed operation of the metadata processor will be described with reference to FIG. 3.

Embodiments of the present disclosure will be described in detail based on the above-described main concept of the present disclosure. In the present disclosure, a compressed media format includes metadata in an output stream of the compressed media format. While the following embodiments will be described based on an MPEG-H 3D Audio format, it would be obvious that those embodiments are also applicable to a general compressed media format.

FIG. 1 is a block diagram of entities of a service eco system in a general broadcasting service.

Referring to FIG. 1, a content provider 110 such as a studio produces content, and the content produced by the content provider 110 is distributed to a broadcasting station 130 of a particular operator through a terrestrial broadcasting network 120 and is directly delivered to a viewer 140 through the terrestrial broadcasting network (120) or is retransmitted to subscribers 145 through a cable, satellite, or IP network via an MVPD 135. The MVPD 135 directly receives the content through a cable network 125 and delivers the content to the subscribers 145 through the cable, satellite, or IP network.

In regard to an embodiment of the present disclosure, at least one of entities shown in FIG. 1 may generate/add/modify/remove/substitute metadata in the present disclosure.

For example, the content provider 110 may generate metadata. In this case, the metadata may be included in a compressed audio bitstream produced by the content provider 110.

An entity of the broadcasting network 120 and/or an entity of the cable network 125 may newly generate metadata, add new metadata to current metadata, or modify or remove the current metadata. In this case, the entity of the broadcasting network 120 and/or the entity of the cable network 125 may substitute the current metadata with the newly generated metadata.

An entity of the broadcasting station 130 and/or an entity of the MVPD 135 may newly generate metadata, add new metadata to current metadata, or modify or remove the current metadata. In this case, the entity of the broadcasting station 130 and/or the entity of the MVPD 135 may substitute the current metadata with the newly generated metadata.

An STB connected to a TV of the subscriber 145 may also perform the addition, modify, removal, and substitution operations with respect to the metadata.

Figure 2:
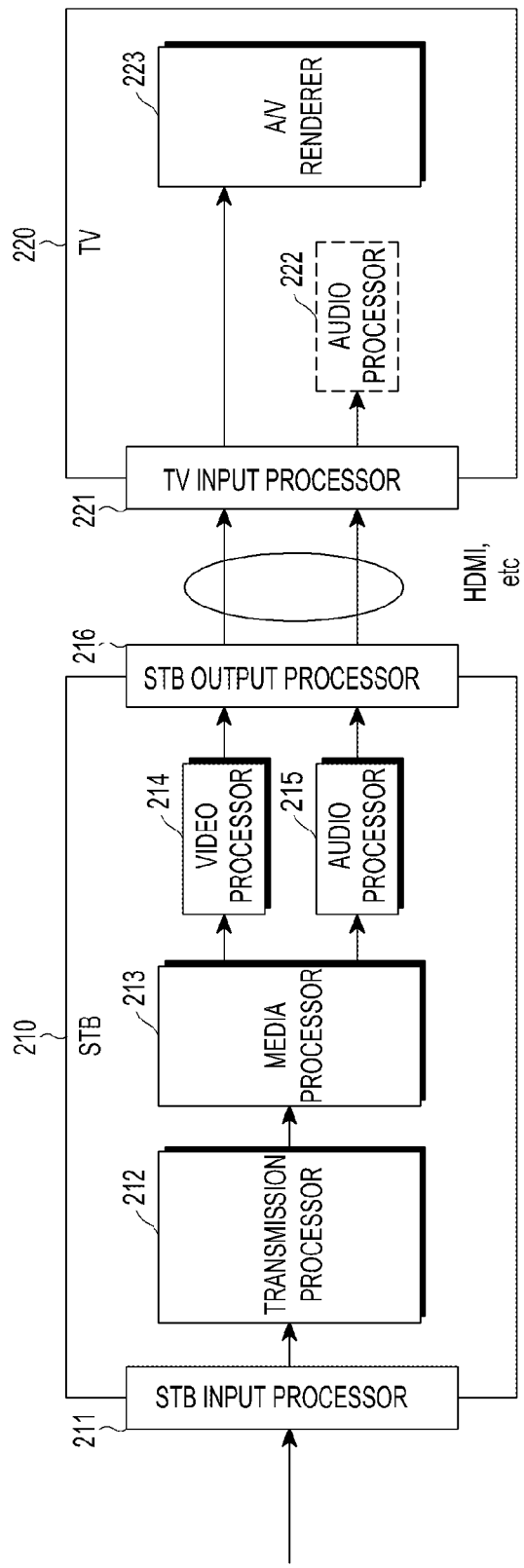
FIG. 2 is a block diagram for describing a media delivery structure between a general set-top box (STB) and a television (TV)

FIG. 2 is a block diagram for describing a media delivery structure between a general STB 210 and a TV 220.

The STB 210 may include an (STB) input processor 211, a transmission processor 212, a media processor 213, a video processor 214, an audio processor 215, and an (STB) output processor 216.

The STB 210 receives a broadcasting signal from the MVPD 135, and the STB input processor 211 converts the broadcasting signal into a digital signal and delivers the digital signal to the transmission processor 212.

The transmission processor 212 restores data units having a predetermined format by using the input digital signal and delivers the restored data units to the media processor 213. The data unit may have a form of an MPEG2-TS packet, an IP packet, an MMTP packet, or a media file, and may carry video/audio data or metadata of a service.

The media processor 213 extracts video data from the data unit, delivers the extracted video data to the video processor 214, extracts audio data, and delivers the extracted audio data to the audio processor 215. For reference, the metadata may be used by the media processor 213 for controlling operations of the video processor 214 and the audio processor 215.

Typically, the video and audio data delivered to the video processor 214 and the audio processor 215 have been compressed according to a predetermined compression algorithm.

The video processor 214 restores the video data into an uncompressed state and delivers the uncompressed video data to the STB output processor 216. The compression algorithm may be, for example, a high efficiency video codec (HEVC) or 3D-Audio defined in the MPEG-H.

The audio processor 215 restores the compressed audio data into an uncompressed state and delivers the uncompressed audio data to the STB output processor 216.

The STB output processor 216 delivers a video/audio signal to a (TV) input processor 221 of a TV 220. A delivery medium may be, for example, a high definition multimedia interface (HDMI) cable, a red-green-blue (RGB) cable, or a component cable.

Meanwhile, the TV 220 may include the input processor 221 and an A/V renderer 223. The TV 220 may further include an audio processor 222, and the TV input processor 221 delivers the video/audio signal delivered through the delivery medium to the A/V renderer 223 for playing back a broadcasting service.

Meanwhile, as described above, during a media delivery process described with reference to FIG. 2, metadata included in content may be lost. For example, before the video/audio signal is delivered to the TV 220 from the STB 210 through an HDMI/RGB cable, etc., media data input to the STB 210 is processed by the media processor 213 or the video processor 214 and the audio processor 215 of the STB 210, such that the metadata may be entirely consumed or removed and only the pure video and/or audio signal may be delivered in an uncompressed form to the TV 220.

Thus, in the present disclosure, to deliver metadata to the TV 220, the audio processor 215 of the STB 210 operates as described below. That is, the audio processor 215 delivers a received audio bitstream in a compressed form to the STB output processor 216 without decompressing, i.e., decoding the received audio bitstream. That is, in a general case, as described above, the audio processor 215 restores the audio data into an uncompressed form and delivers the uncompressed audio data to the STB output processor 216, but the audio processor 215 according to an embodiment of the present disclosure delivers the received audio bitstream in a compressed form to the STB output processor 216, so that metadata included in the audio bitstream may be delivered to the TV 220 through the TV input processor 221.

The TV 220 operating according to an embodiment of the present disclosure may include a metadata processor for processing the metadata delivered to the TV 220 through the audio bitstream. The metadata processor is connected to the audio processor 222 included in the TV 220.

According to a type of the metadata included in the audio bitstream, an operation of the metadata processor may be determined.

In the present disclosure, metadata may include any data which is delivered to a TV through an MVPD transmission network such as a cable, satellite, or IP network, etc., and an STB and is used in the TV.

For example, the metadata may include a service identifier for a service including an audio bitstream including the metadata. The service identifier may be used to identify an audio service compressed into the audio bitstream. The service identifier may be used to identify a multimedia service including a video service related to the audio service or including both the audio service and the video service. In another example, the metadata may include information used for the TV to obtain and play back video/audio data, which is not received from the STB, through another transmission medium. The another transmission medium may include wireless Internet, a Wireless Fidelity (Wi-Fi) network, a third-generation (3G)/fourth-generation (4G)/fifth-generation (5G) mobile communication network, and a storage medium such as a universal serial bus (USB), etc. A scheme for obtaining the video/audio data may be a standard technique such as MPEG2-TS, MMT, DASH, etc., defined in the MPEG, or a technique such as HTTP live streaming (HLS), etc. The form of metadata may be a packet defined in a scheme for obtaining the metadata, or a presentation form of signaling message metadata.

In another example, the metadata may be used to deliver firmware or various software applied to a TV or a general file, etc. The metadata may have a general bitstream form or a file format or a packet form defined in a standardization organization. Thus, the metadata packet may be a packet defined in protocols used in various current communication systems, such as an IP packet, a user datagram protocol (UDP) packet, a remote desktop protocol (RDP) packet, etc. The metadata may further include information about an application to which the metadata is delivered, etc.

Figure 3:
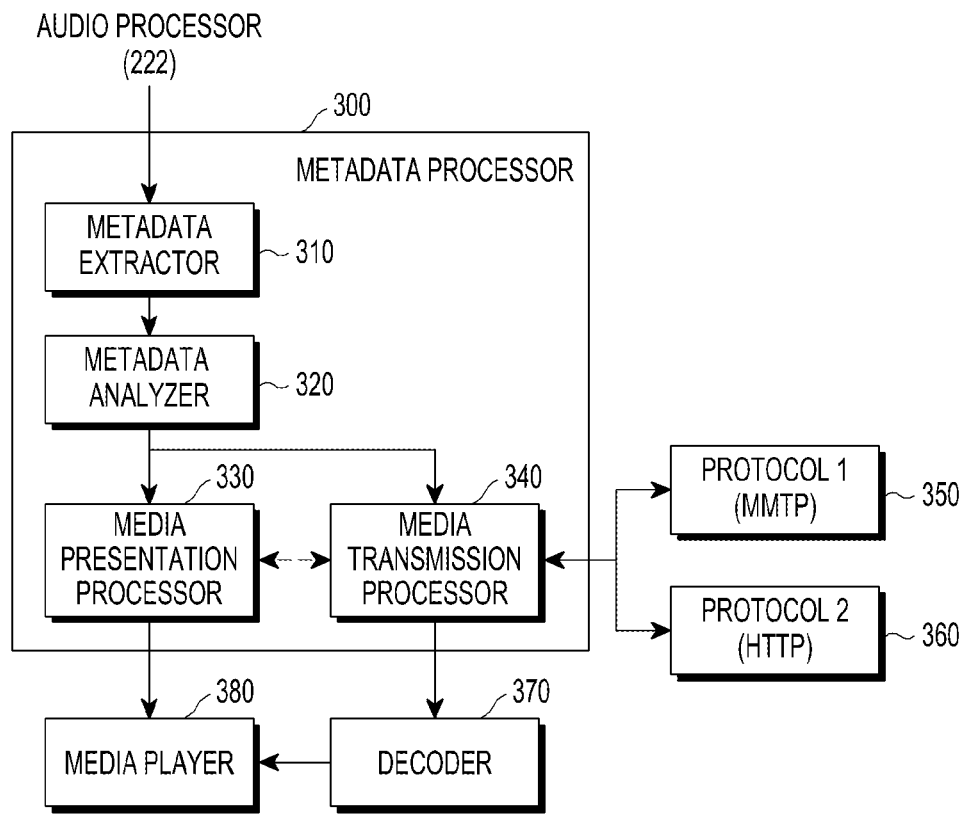
FIG. 3 is a block diagram of a metadata processor when metadata includes information necessary for obtaining and playing back an additional service according to an embodiment of the present disclosure.

With reference to FIG. 3, the metadata processor will be described in more detail. FIG. 3 is a block diagram of a metadata processor 300 when metadata includes information necessary for obtaining and playing back an additional service according to an embodiment of the present disclosure.

The metadata processor 300 is connected to the audio processor 222 of FIG. 2 to receive metadata. The metadata processor 300 may include a metadata processor 310, a metadata analyzer 320, a media presentation processor 330, and a media transmission (delivery) processor 340.

The metadata extractor 310 extracts metadata from an audio stream delivered from the audio processor 222. The metadata analyzer 320 converts the extracted metadata into an information form actually needed for an operation of the metadata processor 300. Out of the information generated by the metadata analyzer 320, information needed for playing back media is delivered to the media presentation processor 330 and information needed for obtaining media data is delivered to the media transmission processor 340.

The media presentation processor 330 processes the information needed for playing back the media and delivers the processed information to a media player 380.

The media transmission processor 340 obtains the media data based on the information needed for obtaining the media data by using separate transmission interface and protocol and delivers the obtained media data to a decoder 370. In FIG. 3, an MMTP 350 and an HTTP 360 are shown as examples of the protocol.

The decoder 370 decodes the media data and delivers the decoded media data to the media player 380 which then plays back the decoded media data by using the information needed for playing back the media, delivered from the media presentation processor 330.

For reference, the metadata may not include all the information needed for playing back the media. In this case, the media transmission processor 340 obtains additional information needed for playing back the media by using separate transmission interface and protocol, and delivers the obtained additional information to the media presentation processor 330.

Meanwhile, an output of the audio processor 222 in FIG. 3 may have the form of an MMTP packet including an MMT signaling message. In this case, the metadata extractor 310 extracts the MMT signaling message to the MMTP packet and delivers the extracted MMT signaling message to the metadata analyzer 320.

The above description made with reference to FIG. 3 is made on the assumption that the metadata includes information needed for obtaining and playing back an additional service. However, if the metadata includes a different type of data, an operation of the metadata processor 300 may differ.

For example, if the metadata includes an identifier of additional content, the metadata processor 300 operates as below. That is, the metadata processor 300 checks a list of additional services regarding content identified by the identifier. Thereafter, the metadata processor 300 obtains media data of the additional service and information needed for playing back the media data by using a separate transmission medium according to user's selection or a predetermined policy, and delivers the obtained media data and information to the decoder 370 and the media player 380. In another example, if the metadata is information in the form of a media presentation description (MPD) form defined in the DASH, the metadata processor 300 delivers the DASH MPD to a separate DASH processor (not shown). If the metadata includes URL information of the DASH MPD, the metadata processor 300 obtains the DASH MPD by using the URL and delivers the obtained DASH MPD to the DASH processor.

In another example, if the metadata includes data used in a particular application, the metadata processor 300 delivers metadata received from the audio processor 222 to suit a separate transmission interface used in the particular application.

As in the above-described examples, the metadata may have various forms such as the MMTP packet, the DASH MPD, and so forth. To process metadata in different formats, the metadata processor 300 may include separate units for the different formats. The metadata processor 300 may be one unit using an element such as a metadata parser 320, etc., capable of processing metadata having a plurality of different formats, together.

All or some of elements of the metadata processor 300 may be included in the audio processor 222 that may include an audio decoder (not shown).

Hereinbelow, a description will be made of an example where the MVPD described in FIG. 1 is configured according to an embodiment of the present disclosure.

Figure 4:
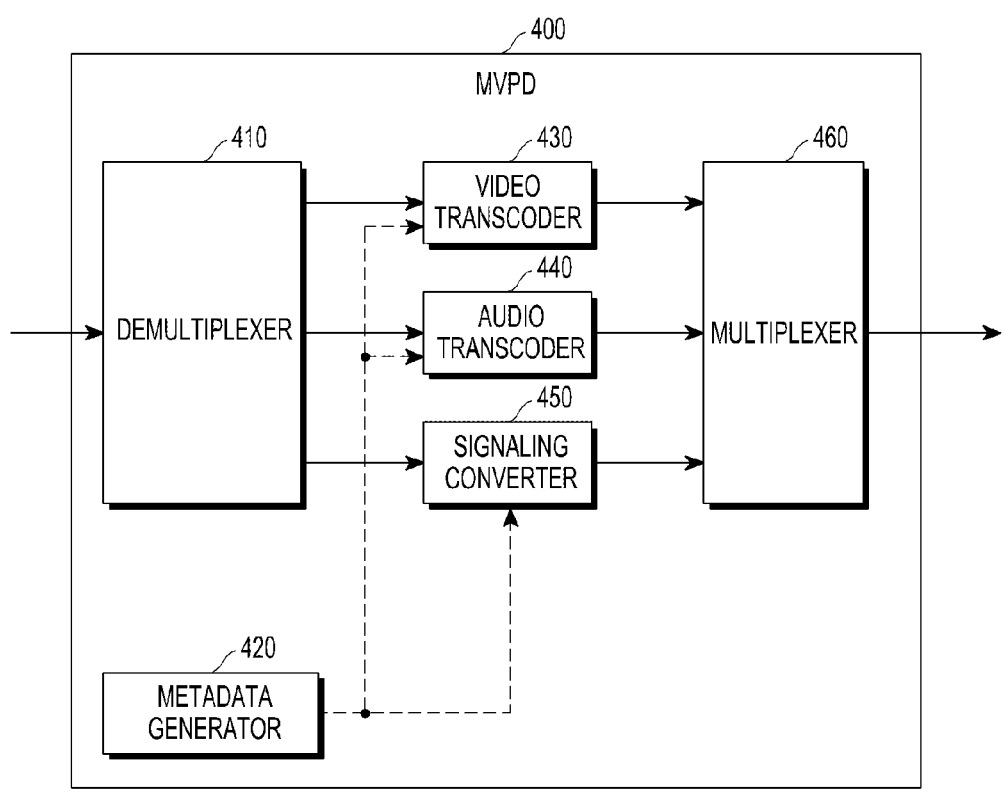
FIG. 4 is a block diagram of a multichannel video programming distributor (MVPD) retransmission system according to an embodiment of the present disclosure.

FIG. 4 is a block diagram of an MVPD retransmission system 400 according to an embodiment of the present disclosure.

The MVPD retransmission system 400 receives broadcasting service data from the cable network 125 or the broadcasting station 130 of FIG. 1. The received broadcasting service data is divided into a video signal, an audio signal, and signaling information by a demultiplexer 410 for delivery into a video transcoder 430, an audio transcoder 440, and a signaling converter 450, respectively. A bitstream of the video signal and the audio signal may include metadata generated by the cable network 125, the broadcasting station 130, or the content provider 110. However, if an input/output interface of the MVPD retransmission system 400 has a separate scheme corresponding to a type of media data, the MVPD retransmission system 400 may not include the demultiplexer 410 and a multiplexer 460.

The transcoders 430 and 440 may perform bitstream conversion such as conversion of a resolution or a bit rate of received video and/or audio data, and outputs of the video transcoder 430, the audio transcoder 440, and the signaling converter 450 are multiplexed by the multiplexer 460 and delivered to subscribers.

The MVPD retransmission system according to an embodiment of the present disclosure may include a metadata generator 420. The metadata generator 420 generates metadata to be delivered to a subscriber's TV and metadata to be delivered to a subscriber's STB. The metadata to be delivered to the subscriber's TV is delivered to the video transcoder 430 or the audio transcoder 440, and the metadata to be delivered to the subscriber's STB is delivered to the signaling converter 450.

The video transcoder 430 and the audio transcoder 440 according to an embodiment of the present disclosure interpret a bitstream and convert metadata included in the current bitstream. More specifically, the video transcoder 430 and the audio transcoder 440 may remove the metadata included in the current bitstream or substitute the metadata included in the current bitstream with new metadata newly generated by the metadata generator 420. The video transcoder 430 and the audio transcoder 440 may also generate a new bitstream by adding the new metadata newly generated by the metadata generator 420 to the metadata included in the current bitstream while maintaining the metadata included in the current bitstream.

For reference, the metadata generator 420 may generate metadata including information for configuring an MVPD service, a personalized advertisement, or information to be delivered to a subscriber's TV or STB. The metadata generator 420 may also receive metadata to be delivered by a third party to the subscriber's TV or STB from the third party and deliver the received metadata to the subscriber's TV or STB.

In a modified embodiment, when the MVPD has a transmission medium capable of delivering personalized metadata to subscriber's STB and TV, the metadata generated by the metadata generator 420 may be directly delivered to the subscriber's STB and TV depending on a purpose of the metadata. In this case, the metadata processor 300 of the TV in FIG. 3 obtains and processes the metadata by using a separate interface instead of the audio processor 222.

The above-described embodiment of the MVPD retransmission system 400 is applicable to not only a retransmission system of an MVPD, but also a retransmission system in which the broadcasting station 130 delivers a broadcasting service, delivered from the broadcasting network 120, to the MVPD 135 or any node on an information flow of delivering a broadcasting service.

Hereinbelow, an example of a structure of an STB according to an embodiment of the present disclosure will be described.

Figure 5:
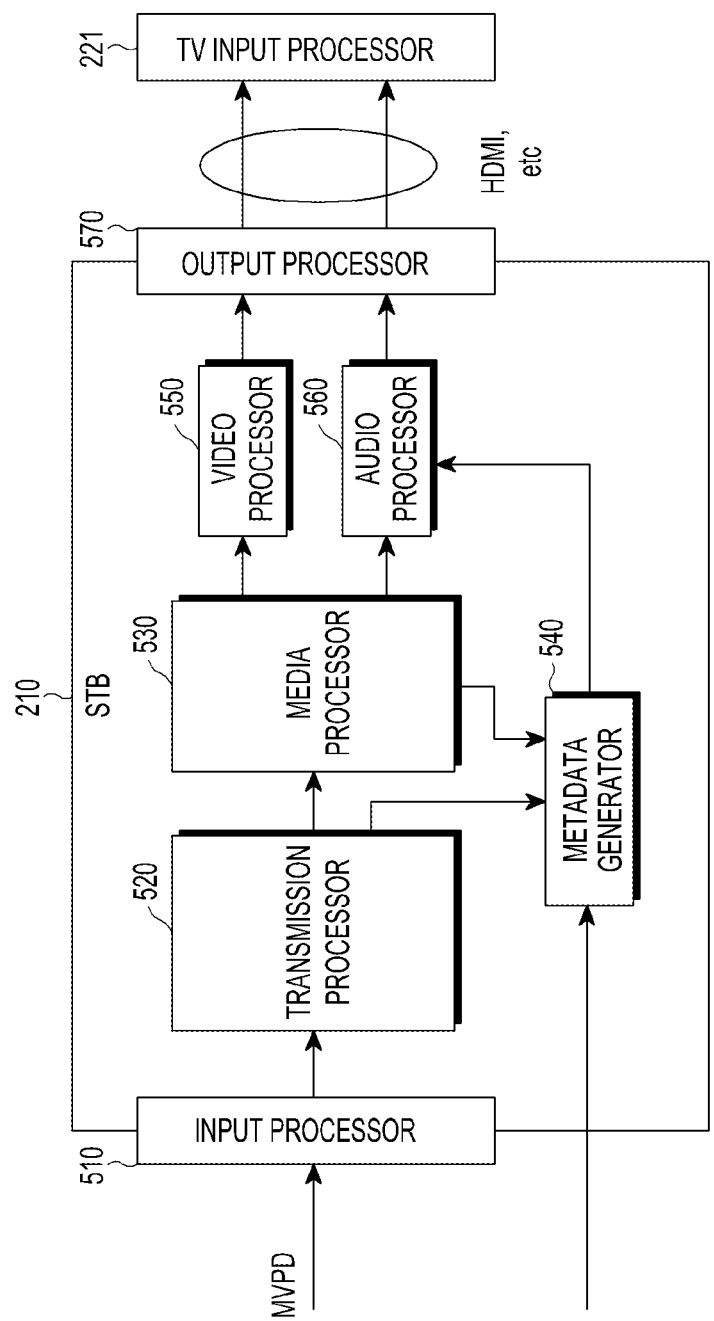
FIG. 5 is a block diagram of an STB according to an embodiment of the present disclosure.

FIG. 5 is a block diagram of an STB 500 according to an embodiment of the present disclosure.

Comparing FIG. 5 with FIG. 2, a metadata generator 540 is added in FIG. according to an embodiment of the present disclosure.

The STB 500 receives a broadcasting signal from an MVPD, and an STB input processor 510 converts the broadcasting signal into a digital signal and transmits the digital signal to a transmission processor 520.

The transmission processor 520 restores data units having a predetermined format by using the input digital signal and delivers the restored data units to a media processor 530. The data unit may have a form of an MPEG2-TS packet, an IP packet, an MMTP packet, or a media file, and may carry video/audio data or metadata of a service.

The media processor 530 extracts video data from the data unit, delivers the extracted video data to a video processor 550, extracts audio data, and delivers the extracted audio data to an audio processor 560. For reference, the metadata may be used by the media processor 530 for controlling operations of the video processor 550 and the audio processor 560. Meanwhile, metadata to be delivered to the TV is delivered to the metadata generator 540.

The metadata generator 540 obtains the metadata from the transmission processor 520, the media processor 530, or a separate input interface, and delivers metadata to be delivered to the TV to the audio processor 560. In a modified embodiment, when the STB is capable of exchanging data with the TV through Wi-Fi, etc., the metadata generated by the metadata generator 540 may be directly delivered to the subscriber's TV depending on a purpose of the metadata. In this case, the metadata processor 300 of the TV according to an embodiment of the present disclosure obtains and processes the metadata by using a separate interface instead of the audio processor 222.

The audio processor 560 interprets a bitstream and removes metadata included in an existing bitstream or substitutes the metadata included in the existing bitstream with the metadata delivered from the metadata generator 540, or generates a new bitstream by adding the metadata delivered from the metadata generator 540 to the metadata included in the existing bitstream while maintaining the metadata included in the existing bitstream.

Like the audio processor 560, the video processor 550 according to an embodiment of the present disclosure interprets a bitstream and removes metadata included in an existing bitstream or substitutes the metadata included in the existing bitstream with the metadata delivered from the metadata generator 540, or generates a new bitstream by adding the metadata delivered from the metadata generator 540 to the metadata included in the existing bitstream while maintaining the metadata included in the existing bitstream.

Hereinbelow, schemes for configuring metadata in various formats according to an embodiment of the present disclosure will be described.

First Embodiment of MPEG-H 3D Audio Format

A first embodiment of an MPEG-H 3D Audio format is an embodiment where metadata is configured using an extended element in mpegh3daFrame( ) of a core bitstream in a format of "MPEG-H 3D Audio" which is the next-generation audio standards of the MPEG. In the first embodiment, modification of a bitstream is easiest to perform and the number of necessary bits is minimized.

In the first embodiment, an example of mpegh3daExtElementConfig( ) is as shown in Table 1.

TABLE 1

| Syntax | No. of bits | Mnemonic |
|---|---|---|
| mpegh3daExtElementConfig( ) { | | |
|     usacExtElementType= escapedValue(4, 8, 16); | | |
|   usacExtElementConfigLength = escapedValue(4, 8, 16); | | |
|   if (usacExtElementDefaultLengthPresent) { | 1 | uimsbf |
|     usacExtElementDefaultLength = escapedValue(8, 16, 0) + 1; | | |
|   } else { | | |
|     usacExtElementDefaultLength = 0; | | |
|   } | | |

TABLE 1-continued

| Syntax | No. of bits | Mnemonic |
|---|---|---|
| usacExtElementPayloadFrag; | 1 | uimsbf |
| switch (usacExtElementType) { | | |
| case ID_EXT_ELE_FILL: | | |
|   /* No configuration element */ | | |
|   break; | | |
| case ID_EXT_ELE_MPEGS: | | |
|   SpatialSpecificConfig( ); | | |
|   break; | | |
| case ID_EXT_ELE_SAOC: | | |
|   SAOCSpecificConfig( ); | | |
|   break; | | |
| case ID_EXT_ELE_AUDIOPREROLL: | | |
|   /* No configuration element */ | | |
|   break; | | |
| case ID_EXT_ELE_UNI_DRC: | | |
|   mpegh3daUniDrcConfig( ); | | |
|   break; | | |
| case ID_EXT_ELE_OBJ_METADATA: | | |
|   ObjectMetadataConfig( ); | | |
|   break; | | |
| case ID_EXT_ELE_SAOC_3D: | | |
|   SAOC3DSpecificConfig( ); | | |
|   break; | | |
| case ID_EXT_ELE_HOA: | | |
|   HOAConfig( ); | | |
|   break; | | |
| case ID_EXT_ELE_FMT_CNVRTR | | |
|   /* No configuration element */ | | |
|   break; | | |
| case ID_EXT_ELE_SYS_META | | |
|   /* No configuration element */ | | |
|   break; | | |
| default: | NOTE | |
|   while (usacExtElementConfigLength-) { | | |
|     tmp; | 8 | uimsbf |
|   } | | |
|   break; | | |
|   } | | |
| } | | |

NOTE:
The default entry for the usacExtElementType is used for unknown extElementTypes so that legacy decoders can cope with future extensions.

In Table 1, usacExtElementType is an element for indicating a bit stream extension type of a bitstream and a detailed meaning may be defined as shown in Table 2.

TABLE 2

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| ID_EXT_ELE_SYS_METAL | 9 |
| /* reserved for ISO use */ | 10-127 |
| /* reserved for use outside of ISO scope */ | 128 and higher |

NOTE:
Application-specific usacExtElementType values are mandated to be in the space reserved for use outside of ISO scope. These are skipped by a decoder as a minimum of structure is required by the decoder to skip these extensions.

Table 3 shows an example of usacExtElementSegmentData according to usacExtElementType.

TABLE 3

| usacExtElementType | The concatenated usacExtElementSegmentData represents: |
|---|---|
| ID_EXT_ELE_FILL | Series of fill_byte |
| ID_EXT_ELE_MPEGS | SpatialFrame( ) |
| ID_EXT_ELE_SAOC | SaocFrame( ) |
| ID_EXT_ELE_AUDIOPREROLL | AudioPreRoll( ) |
| ID_EXT_ELE_UNI_DRC | uniDrcGain( ) as defined in ISO/IEC 23003-4 |
| ID_EXT_ELE_OBJ_METADATA | object_metadata( ) |
| ID_EXT_ELE_SAOC_3D | Saoc3DFrame( ) |
| ID_EXT_ELE_HOA | HOAFrame( ) |
| ID_EXT_ELE_FMT_CNVRTR | FormatConverterFrame( ) |
| ID_EXT_ELE_SYS_META | SysMetaFrame( ) |
| unknown | unknown data. The data block shall be discarded. |

In Table 3, an example of SysMetaFrame( ) is as shown in Table 4.

TABLE 4

| Syntax | No. of bits | Mnemonic |
|---|---|---|
| SysMetaFrame( ) | | |
| { | | |
|   sysType = escapedValue (2, 4, 0); | | |
|   msgLen  = escapedValue (4, 8, 16); | | |

TABLE 4-continued

| Syntax | No. of bits | Mnemonic |
|---|---|---|
| msgType      = escapedValue (3, 5, 0); | | |
| switch (msgType) { | | |
| case NO_SYS_MSG: | | |
|   /* No action */ | | |
|   break; | | |
| case MSG_START: | | |
|   ReadMsgBuffer( ); | | NOTE 1 |
|   break; | | |
| case MSG_APPEND: | | |
|   AppndMsgBuffer( ); | | NOTE 2 |
|   break; | | |
| case MSG_END: | | |
|   AppendMsgBuffer( ); | | |
|   SendMsgBuffer( ); | | NOTE 3 |
|   break; | | |
| case MSG_ONE: | | |
|   ReadMegBuffer( ); | | |
|   SendMsgBuffer( ); | | |
| default: | | NOTE 4 |
|   while (msgLen -) { | | |
|     tmp; | 8 | uimsbf |
|   } | | |
|   break; | | |
| } | | |
| { | | |

NOTE 1:
ReadMsgBuffer( ) reads msgLen bytes from the bitstream and copies to the initialized empty buffer for the sysType.
NOTE 2:
AppndMsgBuffer( ) reads msgLen bytes from the bitstream and append to the pre defined buffer for the sysType.
NOTE 3:
SendMsgBuffer( ) sends the whole data written on the buffer for the sysType to the destination defined in Table B.
NOTE 4:
The default entry for the msgType is used for unknown extElementTypes so that legacy decoders can cope with future extensions.

In Table 4, "msgType" is an element for signaling whether metadata is included and whether to perform segmentation, and a detailed value thereof may be assigned as shown in Table 5.

TABLE 5

| msgType | Value |
|---|---|
| NO_SYS_MSG | 0 |
| MSG_START | 1 |
| MSG_APPEND | 2 |
| MSG_END | 3 |
| MSG_ONE | 4 |
| /* reserved */ | 5 and higher |

"sysType" included in Table 4 is an element for signaling a presentation form of metadata and an MPEG system, etc., for processing the metadata, and a detailed value thereof may be assigned as shown in Table 6.

TABLE 6

| sysType | Value | Destination |
|---|---|---|
| SYS_MP2TS | 0 | MPEG 2 TS Packet with Section[ ] |
| SYS_MMT | 1 | MMTP Packet for Signaling Message[ ] |
| SYS_DASH | 2 | DASH MPD |
| /* reserved */ | 3 and higher | |

In Table 6, if "sysType" is "SYS_MP2TS", the metadata is configured in the form of an MPEG2-TS packet, and if "sysType" is "SYS_MMT", the metadata is configured in the form of an MMTP packet.

In another embodiment, the MPEG2-TS packet and the MMTP packet may have a packet structure for delivering signaling. When "sysType" is "SYS_DASH", the metadata may be an xml document such as DASH MPD, etc., and in another embodiment, the metadata may be URL information used for a TV receiver to obtain the xml document.

In an embodiment using Table 6, a packet is assumed to be delivered, but in actual implementation, metadata in various forms may be delivered as below.

MMT signaling messages
MMT signaling table
MPEG2 sections
additional audio data
bootstrap information for obtaining an additional service (e.g., URL information)
identifier of an audio bitstream in which metadata is transmitted or identifier of a service including audio (e.g., Asset_id)

In another embodiment of the present disclosure, data in a general file form may be delivered through SysMetaFrame( ), and in this case, "sysType" may have a value such as SYS_FILE, etc. It should be noted that the data in the file form may be configured and delivered in a separate frame instead of being included in SysMetaFrame( ). In addition, sysType of Table 6 may be extended to include a general IP packet or HTML document, etc.

Second Embodiment of MPEG-H 3D Audio Format

In the second embodiment of the MPEG-H 3D Audio format, information necessary for mpegh3daFrame( ) that is a higher than in the first embodiment is added. In the second embodiment, metadata is added to a usacElementType field that is a field based on characteristics of an audio codec, and the usacElementType field is defined in the United States Auto Club rather than in mpeg3da.

An example of mpegh3daFrame( ) according to an embodiment of the present disclosure is as shown in Table 7.

TABLE 7

| Syntax | No. of bits | Mnemonic |
|---|---|---|
| mpegh3daFrame( ) | | |
| { | | |
|   usacIndependencyFlag; | 1 | uimsbf |
|   for (elemIdx=0; elemIdx<numElements; ++elemIdx) { | | |
|     if (  (usacElementType[elemIdx] != ID_USAC_EXT)   && | | |
|         (elementLengthPresent == 1)           ) { | | |
|       elementLength | 16 | uimsbf |
|     } | | |
|     switch (usacElementType[elemIdx]) { | | |
|     case ID_USAC_SCE: | | |
|       mpegh3daSingleChannelElement(usacIndependencyFlag); | elementLength, NOTE 1 | |
|       break; | | |

TABLE 7-continued

| Syntax | No. of bits | Mnemonic |
|---|---|---|
|     case ID_USAC_CPE:<br>        mpegh3daChannelPairElement(usacIndependencyFlag);<br>        break;<br>    case ID_USAC_LFE:<br>        mpegh3daLfeElement(usacIndependencyFlag);<br>        break;<br>    case ID_USAC_EXT:<br>        mpegh3daExtElement(usacIndependencyFlag);<br>        break;<br>    case ID_USAC_SysMeta:<br>        mpegh3daSysMetaElement (usacIndependencyFlag);<br>        break;<br>    }<br>} | elementLength, NOTE 1<br><br><br>elementLength, NOTE 1<br><br><br><br><br><br>elementLength | |

NOTE 1:
If present, elementLength represents the length of the corresponding element it refers to in number of bits.

In Table 7, "mpegh3daSysMetaElement( )" may be configured in a form that is similar to SysMetaFrame( ) of Table 4, and thus a detailed grammar of "mpegh3daSys- MetaElement( )" will not be described.

Third Embodiment of MPEG-H 3D Audio Format

In the third embodiment of the MPEG-H 3D audio format, the metadata may be included in "mpegh3daConfig- Extension". The third embodiment is to be mainly used when a configuration file is modified, and has to be called once in one mp4 file. An example of mpegh3daConfigExtension is as shown in Table 8.

TABLE 8

| Syntax | No. of bits | Mnemonic |
|---|---|---|
| mpegh3daConfigExtenion( )<br>{<br>  numConfigExtensions = escapedValue(2,4,8) + 1;<br>  for (confExtIdx=0: confExtIdx<numConfigExtensions; confExtIdx++)<br>  {<br>    usacConfigExtType[confExtIdx]          = escapedValue (4,8,16);<br>    usacConfigExtLength[confExtIdx]       =<br>escapedValue(4,8,16);<br>    switch (usacConfigExtType[confExtIdx]) {<br>    case ID_CONFIG_EXT_FILL:<br>      while _usacConfigExtLength[confExtIdx]-) {<br>        fill_byte[i]; /* should be '10100101' */<br>      }<br>      break;<br>    case ID_CONFIG_EXT_DOWNMIX:<br>      downmixConfig( );<br>      break;<br>    case ID_CONFIG_EXT_LOUDNESS_INFO:<br>      mpegh3daLoudnessInfoSet( );<br>      break;<br>    case ID_CONFIG_EXT_AUDIOSCENE_INFO:<br>      mae_AudioSceneInfo( );<br>      break;<br>    case ID_CONFIG_EXT_HOA_MATRIX:<br>      HoaRenderingMatrixSet( );<br>      break;<br>    case ID_CONFIG_EXT_SYS_META;<br>      sysConfig( );<br>      break;<br>    default:<br>      while (usacConfigExtLength[confExtIdx]-) {<br>        tmp;<br>      }<br>      break;<br>    }<br>  }<br>} | <br><br><br><br><br><br><br><br><br><br><br>8<br><br><br><br><br><br><br><br><br><br><br><br><br><br><br><br><br>8 | <br><br><br><br><br><br><br><br><br><br><br>uimsbf<br><br><br><br><br><br><br><br><br><br><br><br><br><br><br><br><br>uimsbf | usacConfigExtType of Table 8 may be defined as shown in Table 9.

TABLE 9

| usacConfigExtType | Value |
|---|---|
| ID_CONFIG_EXT_FILL | 0 |
| ID_CONFIG_EXT_DOWNMIX | 1 |
| ID_CONFIG_EXT_LOUDNESS_INFO | 2 |
| ID_CONFIG_EXT_AUDIOSCENE_INFO | 3 |
| ID_CONFIG_EXT_HOA_MATRIX | 4 |
| ID_CONFIG_EXT_SYS_META | 5 |
| /* reserved for ISO use */ | 6-127 |
| /* reserved for use outside of ISO scope */ | 128 and higher | sysConfig( ) of Table 8 may be configured in a form that is similar to SysMetaFrame( ) of Table 4, and thus a detailed grammar of sysConfig( ) will not be described.

As stated above, in the embodiments of the present disclosure, metadata may include any data which is delivered to a TV through an MVPD transmission network such as a cable, satellite, or IP network, etc., and an STB and is used in the TV. For example, the metadata may include a service identifier for a service including an audio bitstream including the metadata or a universally unique identifier (UUID). The service identifier may be used to identify an audio service compressed into the audio bitstream. In another example, the service identifier may be used to identify a multimedia service including a video service related to the audio service or including both the audio service and the video service.

In another embodiment, the metadata may include information used for the TV to obtain and play back video/audio data, which is not received from the STB, through another transmission medium. The another transmission medium may include wireless Internet, a Wi-Fi network, a 3G/4G/5G mobile network, and a storage medium such as a USB, etc. A scheme for obtaining the video/audio data may be a standard technique such as MPEG2-TS, MMT, DASH, etc., defined in the MPEG, or a technique such as HLS, etc. The form of metadata may be a packet defined in a scheme for obtaining the metadata, or an expression form of signaling message metadata.

In another embodiment, the metadata may be used to deliver firmware or various software applied to a TV or a general file, etc. The metadata may have a general bitstream form or a file format or a packet form defined in a standardization organization. Thus, the metadata packet may be a packet defined in protocols used in various current communication systems, such as an IP packet, a UDP packet, an RDP packet, etc. The metadata may further include information about an application to which the metadata is delivered, etc.

The invention claimed is:

1. A method for processing data in a television (TV) device, the method comprising:
receiving an audio stream comprising metadata delivered from a set-top box to the TV device, extracting the metadata from the audio stream, modifying the extracted metadata to process the metadata, delivering information for presenting media data to a media player if the metadata includes the information for presenting the media data, and delivering information for obtaining media data to a media transmission processor if the metadata includes the information for obtaining the media data;
obtaining the media data through predetermined interface and protocol by using the information for obtaining the media data;
decoding the obtained media data; and
presenting the decoded media data by using the information for presenting the media data.

2. The method of claim 1, further comprising:
extracting a Moving Picture Experts Group (MPEG) media transport (MMT) signaling message from an MMT protocol (MMTP) packet if the metadata is the MMTP packet comprising the MMT signaling message; and
obtaining content corresponding to an identifier by using the identifier of the content if the metadata is the identifier of the content.

3. A television (TV) device for processing data, the TV device comprising:
a metadata processor configured to process metadata, wherein the metadata processor comprises:
a metadata extractor configured to receive an audio stream comprising metadata delivered from a set-top box to the TV device and to extract the metadata from the audio stream;
a metadata analyzer configured to modify the extracted metadata to process the metadata to deliver information for presenting media data to a media player if the metadata includes the information for presenting the media data, and to deliver information for obtaining media data to a media transmission processor if the metadata includes the information for obtaining the media data;
the media transmission processor configured to obtain the media data through a predetermined interface and protocol by using the information for obtaining the media data and to deliver the obtained media data to a decoder;
wherein the TV device further comprises:
the decoder configured to decode the obtained media data; and
the media player configured to present the decoded media data by using the information for presenting the media data.

4. The TV device of claim 3, wherein the metadata analyzer is further configured to extract a Moving Picture Experts Group (MPEG) media transport (MMT) signaling message from an MMT protocol (MMTP) packet if the metadata is the MMTP packet comprising the MMT signaling message, and
the media transmission processor is further configured to obtain content corresponding to an identifier by using the identifier of the content if the metadata is the identifier of the content.

* * * * *